United States Patent [19]
Li et al.

[11] Patent Number: 5,847,920
[45] Date of Patent: Dec. 8, 1998

[54] ELECTROCHEMICAL CAPACITOR WITH HYBRID POLYMER POLYACID ELECTROLYTE

[75] Inventors: Changming Li, Vernon Hills; Robert H. Reuss, Inverness; Marc Chason, Schaumburg, all of Ill.

[73] Assignee: Motorola, Inc., Schaumburg, Ill.

[21] Appl. No.: 937,430

[22] Filed: Sep. 25, 1997

[51] Int. Cl.⁶ ............................... H01G 9/02; H01G 9/04
[52] U.S. Cl. ...................... 361/525; 361/528; 361/532; 29/25.03
[58] Field of Search ...................... 361/502, 503, 361/504, 505, 508, 511, 512, 516, 520, 523, 524, 525, 526, 527, 530, 532, 534, 528; 29/25.03; 429/29, 30, 33, 34, 36, 40, 42, 46, 128, 129, 188, 190, 191, 192–194, 195, 203–204, 206, 207, 209, 212, 213, 218, 219, 231–233; 252/62.2, 500

[56] References Cited

U.S. PATENT DOCUMENTS

| | | | |
|---|---|---|---|
| 3,502,947 | 3/1970 | Hand | 361/504 |
| 4,031,436 | 6/1977 | Alwitt | 361/301 |
| 5,382,481 | 1/1995 | Fleischer | 429/192 |
| 5,512,391 | 4/1996 | Fleischer | 429/213 |
| 5,518,838 | 5/1996 | Bai et al. | 429/191 |
| 5,580,681 | 12/1996 | Fleischer | 429/192 |
| 5,604,660 | 2/1997 | Bai et al. | 361/525 |
| 5,723,231 | 3/1998 | Wu et al. | 429/203 |
| 5,751,541 | 5/1998 | Li et al. | 361/525 |

*Primary Examiner*—Kristine Kincaid
*Assistant Examiner*—Anthony Dinkins
*Attorney, Agent, or Firm*—Felipe J. Farley

[57] ABSTRACT

A capacitor (100) includes first and second electrodes (102, 103) an adhesive electrolyte (125) positioned therebetween. The adhesive electrolyte (125) includes an organic polymer and an inorganic component, which is either a polyacid or a polysalt.

7 Claims, 1 Drawing Sheet

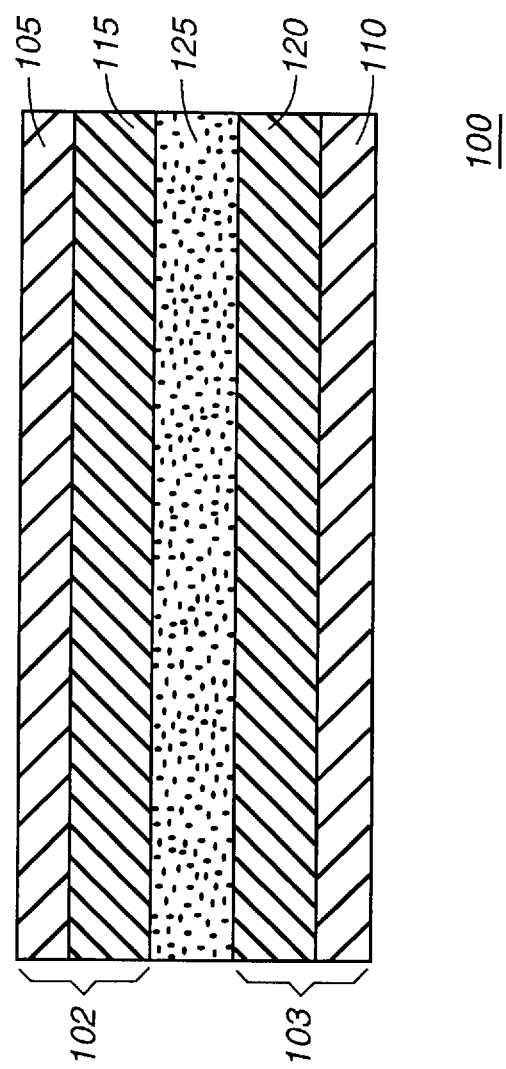

ELECTROCHEMICAL CAPACITOR WITH HYBRID POLYMER POLYACID ELECTROLYTE

RELATED APPLICATIONS

This application is related to U.S. application Ser. No. 08/936,789, filed Sep. 25, 1997, to Li et al., entitled "Electrochemical Capacitor with Solid Electrolyte."

TECHNICAL FIELD

This invention relates in general to capacitors, and more specifically to electrolytes for use in electrochemical capacitors.

BACKGROUND

Electrochemical capacitors typically include outer substrates upon which electroactive material is disposed. Both outer substrates and electroactive material disposed thereon can be formed from equivalent materials, in which case the capacitor is "symmetrical", or different materials, in which case the capacitor is "asymmetrical." Each outer substrate and its corresponding electroactive material forms an electrode, and positioned between the two electrodes is an electrolyte that is ionically conductive and electrically insulative. In a multiple cell capacitor, several electrode and electrolyte layers can be formed between the two outer electrodes to provide the functionality of a plurality of capacitors within a single package. Recently, polymer electrolytes, as opposed to liquid electrolytes, have been used for ease of assembly and manufacture.

It is desirable for solid electrolytes, such as polymer electrolytes, to be highly ionically conductive, stable at temperatures between 100° and 200° Centigrade (C.), minimally reactive, and low in cost. However, only a few known polymer electrolytes, such as perfluorinated sulphonic membranes, e.g., Nafion by DuPont, and polybenzimidazoles (PBI), can be used at high temperatures, and these electrolytes are relatively expensive. Furthermore, many known polymer electrolytes do not adhere well to the electrode surface, which can cause assembly problems and increased interfacial resistance between the electrode and the electrolyte.

Thus, what is needed is an improved polymer electrolyte for use in capacitors.

BRIEF DESCRIPTION OF THE DRAWING

FIG. 1 a side, cutaway view of an electrochemical capacitor in accordance with the present invention.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, a side, cutaway view of an energy storage device 100, such as a capacitor or an electrochemical cell, is shown. The energy storage device 100, hereinafter referred to as a capacitor for illustrative purposes only, includes electrodes 102, 103 between which a polymer electrolyte 125 is positioned. The electrodes 102, 103 each include a current collector 105, 110 and electroactive material 115, 120. As shown, the current collectors 105, 110 can comprise metallic substrates, and the electroactive material 115, 120 can comprise metal oxide disposed on the substrates. Alternatively, one or both of the electrodes 102, 103 could be formed from polymer in which current collecting material, such as electrically conducting fibers or particles, and electroactive material are embedded.

By way of example, the current collecting material can be formed from fibers or substrates fabricated of aluminum, copper, titanium, alloys thereof, or combinations thereof. The electroactive material is preferably $RuO_2$, although other materials can also be used. Such other materials include, among others, iridium, cobalt, platinum, tungsten, vanadium, iron, nickel, alloys thereof, mixtures thereof, their oxides, and reduction/oxidation (redox) polymers. Particular examples of capacitor electrode materials are disclosed in U.S. Pat. No. 5,518,838 to Bai et al., entitled "Electrochemical Cell Having Solid Polymer Electrolyte and Asymmetrical Inorganic Electrodes"; U.S. Pat. No. 5,510,046 to Li et al., entitled "Modified Electrolyte for Electrochemical Cells"; U.S. Pat. No. 5,563,765 to Lian et al., entitled "Amorphous Cobalt Alloy Electrodes for Aqueous Electrochemical Devices"; U.S. Pat. No. 5,429,895 to Lian et al., entitled "Nickel Alloy Electrodes for Electrochemical Devices"; and U.S. Pat. No. 5,568,353 to Bai et al., entitled "Electrochemical Capacitor and Method of Making Same", the disclosures of which are incorporated herein by reference.

In accordance with the present invention, the electrolyte 125 is formed from a polysalt or a polyacid, such as an isopolyacid or a heteropolyacid, both of which exhibit a relatively high degree of protonic activity. Among the various polyacids and polysalts, phosphotungstic acid (PWA) and phosphomolybdic acid (PMA), in their 29-water molecule hydrate forms ($H_3PWA_{12}O_{40} \cdot 29H_2O$ and $H_3PMo_{12}O_{40} \cdot 29H_2O$, respectively), are characterized by considerable protonic conductivity. More specifically, PWA in its solid state form and at room temperature has a protonic conductivity of about 0.17 Siemens/centimeter (S/cm), and room temperature PMA has a protonic conductivity of about 0.18 S/cm. These values are about twice as high as those for the prior art electrolytes of $PVA/H_3PO_4$ and $PBI/H_3PO_4$, both of which have conductivities of about $8 \times 10^{-2}$ S/cm. PWA and PMA also have relatively high thermal stabilities. For example, the loss weight of PWA on ignition at 800° C. is less than 17%.

Polyacids, such as PWA, PMA, and silicontungstic acid (PSA), are also relatively low in cost. Specifically, the price of PWA is much lower than known high temperature polymer electrolyte materials such as Nafion membrane and PBI film. Nafion membrane costs about $800/m^2$, and PBI film costs between $80/m^2$ and $100/m^2$, while PWA only costs approximately $2/m^2$. The high ionic conductivity together with thermal stability and low cost make polyacids a viable and desirable alternative to many known electrolytes.

In accordance with the present invention, an inorganic polyacid or its salt can be mixed with at least one organic polymer to form a uniform precursor electrolyte solution. This solution can then be easily coated or printed onto an electrode surface to form a solid, or polymer, capacitor that uses a hybrid inorganic-organic solid electrolyte in a gel-like form. More particularly, the polyacid or polysalt is admixed with an organic polymer that is at least partially compatible with the polyacid, or polysalt, to result in a uniform and adhesive precursor solution that can be easily coated or printed in a manufacturing process. Once the electrolyte precursor solution is printed onto an electrode surface, an electrochemical cell can be fabricated by laminating together two electrolyte-coated electrodes having wet surfaces, since the precursor solution is adhesive. The resulting thin electrolyte film in combination with the high ionic conductivity of the polyacid electrolyte conveniently produces a capacitor with low equivalent series resistance (ESR). Additionally, high temperature performance can be enhanced by selecting a high temperature organic polymer, and polymers may be selected or blended to adjust for adhesion, solubility, viscosity, and other characteristics to optimize manufacturability and/or performance.

A solution with an organic polymer and an inorganic compound, such as an inorganic polyacid/polysalt, can be obtained by using a mutually miscible solvent that can dissolve both organic and inorganic components. Preferably, the solvent is water or a water-containing solvent, although any other mutually miscible solvent, whether organic or inorganic, can be employed. It will be appreciated that higher temperatures could be required to dissolve both the organic polymer and the inorganic polyacid, and that such temperatures can vary according to the polymer and polyacid selection so that temperatures can range from about ambient temperature up to the boiling point of the solvent.

To prepare the inorganic-organic electrolyte solution, the organic component, i.e., the organic polymer, should be at least partially compatible with the polyacid or salt. For example, the organic polymer could include, among others, poly(vinyl alcohol) (PVA), poly(vinyl fluoride), polyethylene oxide, polyethyleneimine, polyacrylic acid, polyethylene glycol, cellulose acetate, polyvinylmethylethyl ether, phenol formaldehyde resins, poly(acrylamide-co-acylic acid), and mixtures thereof.

The inorganic component, i.e., the polyacid or its salt, in the solution is typically represented by the generic formula:

$M_m[X_xY_yO_z]nH_2O$, where X and Y, which are dissimilar in nature, can be selected from the group consisting of boron, aluminum, gallium, silicon, germanium, tin, phosphorus, arsenic, antimony, bismuth, selenium, tellurium, iodine, and the first, second, third, and fourth transitional metal series, which includes scandium, yttrium, lanthanum, actinium, titanium, zirconium, hafnium, vanadium, niobium, tantalum, chromium, molybdenum, and tungsten. M is selected from the group consisting of hydrogen, ammonium, sodium, potassium, lithium, rubidium, cesium, beryllium, magnesium, calcium, strontium, and barium. The inorganic compound is a polyacid when M is hydrogen and a polysalt when M is a metal ion, and, for both polyacids and salts, m is an integer ranging from 1 to 10. For heteropolyacids or their salts, y is an integer of 6 to 12 with x equal to 1, z is an integer of 30 to 80, and n is an integer of 3 to 100. For isopolyacids or isopolyacid salts, x is 0, y is an integer of 2 to 13, z is an integer of 7 to 80, and n is an integer of 2 to 100.

EXAMPLES

Polymolybdo-phosphoric acid (PMA) and polytungsto-phosphoric acid (PTA) were used to prepare several hybrid organic-inorganic solutions. To prepare each solution, the organic polymer was first dissolved in water at boiling temperature. The polyacid was then added into the polymer solution and stirred until a uniform solution was obtained. The prepared solutions, all of which were adhesive, were:

a) 65% PMA+10% PVA;
b) 65% PTA+10% PVA;
c) 65% PMA+5% polyacrylamide (Paam);
d) 65% PTA+5% Paam;
e) 65% PMA+5% Paam+0.5% acrylamide; and
f) 65% PTA+5% Paam+0.5% acrylamide.

One single-cell device was made for each of the above electrolyte solutions. For each electrolyte solution, two electrodes were formed, each with a thin Ti foil substrate on which $RuO_2$ was thermally formed. Each of the two electrodes was then coated on a single surface with the electrolyte solution to be tested, and another coat of the electrolyte solution was applied after the first coat had dried into a thin film, subsequent to which the two electrodes having wet surfaces were laminated together. Since the electrolyte was adhesive, the two electrodes for each single-cell device were able to be bonded together with excellent integrity. This experiment resulted in six single-cell devices, each including one of the electrolyte solutions listed above.

Additionally, a three-cell device was also fabricated using an electrolyte solution of 65% PTA and 5% Paam. Four electrodes were formed from thermally formed $RuO_2$ on Ti foil substrates. Two of the electrodes, i.e., the outer electrodes, were coated on a single surface with two coats of the electrolyte solution. The other two of the electrodes, i.e., the inner, bipolar electrodes, were coated on both opposing surfaces with two coats of the electrolyte solution. The three-cell device was then assembled by laminating together the two bipolar electrodes and laminating each outer electrode to a different one of the bipolar electrodes.

A potentiostat and a Hewlett Packard milliohmeter were used to conduct cyclic voltammogram (CV) experiments and conductivity measurements, respectively. The results, which are shown in the table below, indicate that the thin electrolyte film along with the high ionic conductivity of the polyacid advantageously produces a low ESR device.

TABLE

Experimental Results

| Device Type | Precursor Solution | Surface Area (cm$^2$) | Capacitance (mF/cm$^2$) | Electrolyte Thickness (mils/cell) | ESR (m) | Unit ESR (m · cm$^2$) |
|---|---|---|---|---|---|---|
| 1-cell | PMA-PVA | 2 | 52 | 0.52 | 48 | 96 |
| 1-cell | PTA-PVA | 2 | 45 | 0.48 | 45 | 90 |
| 1-cell | PMA-Paam | 0.5 | 42 | 0.42 | 124 | 62 |
| 1-cell | PTA-Paam | 0.5 | 47 | 0.40 | 92 | 46 |
| 1-cell | PMA-Paam-acr. | 2 | 39 | 0.62 | 54 | 108 |
| 1-cell | PTA-Paam-acr. | 2 | 45 | 0.56 | 49 | 98 |
| 3-cell | PTA-Paam | 2 | 15 | 0.45 | 81 | 54/cell |

In summary, polyacid/polysalt polymer electrolytes formed from a hybrid inorganic-organic precursor electrolyte solution can be used in capacitors, such as electrochemical, electrolytic, and double layer capacitors, to yield excellent performance as well as improved manufacturability. Such electrolytes are mechanically strong and can be formed into thin electrolyte layers to conveniently reduce device ESR and also are adhesive so that interfacial resistance between the electrode and electrolyte is low. Additionally, the polyacid/polysalt electrolytes do not corrode metals, making them useful in capacitors using metallic current collectors. These advantages, in view of their thermal stabilities, low costs, high protonic conductivities, and ease of printing and coating, make polyacid/polysalt polymer electrolytes a desirable alternative to prior art polymer electrolytes used in capacitors.

What is claimed is:

1. A capacitor, comprising:

first and second electrodes; and an adhesive electrolyte positioned therebetween, comprising an organic polymer and an inorganic component including one of a polyacid or a polysalt, wherein the inorganic component is represented by the formula $M_m[X_xY_yO_z]nH_2O$, wherein:

X and Y are selected from the group consisting of boron, aluminum, gallium, silicon, germanium, tin, phosphorus, arsenic, antimony, bismuth, selenium, tellurium, iodine, and the first, second, third, and fourth transitional metal series;

M is selected from the group consisting of hydrogen and metal ions;

x is an integer from 0 to 1;

y is an integer from 2 to 13;

z is an integer from 7 to 80;

n is an integer from 2 to 100; and m is an integer from 1 to 10.

2. The capacitor of claim 1, wherein the inorganic component is a heteropolyacid or a heteropolyacid salt, y is an integer of 6 to 12 with x equal to 1, z is an integer of 30 to 80, and n is an integer of 3 to 100.

3. The capacitor of claim 1, wherein the inorganic component is an isopolyacid or an isopolyacid salt.

4. A capacitor, comprising:

first and second electrodes; and an electrolyte positioned between the first and second electrodes, the electrolyte including an inorganic component comprising one of a polyacid or a polysalt, the electrolyte further including an organic component comprising a polymer, wherein the inorganic component is represented by the formula $M_m[X_xY_yO_z]nH_2O$, wherein:

X and Y are selected from the group consisting of boron, aluminum, gallium, silicon, germanium, tin, phosphorus, arsenic, antimony, bismuth, selenium, tellurium, iodine, and the first, second, third, and fourth transitional metal series;

M is selected from the group consisting of hydrogen and metal ions;

x is an integer from 0 to 1;

y is an integer from 2 to 13;

z is an integer from 7 to 80;

n is an integer from 2 to 100; and m is an integer from 1 to 10.

5. The electrochemical cell of claim 4, wherein the inorganic component is a heteropolyacid or a heteropolyacid salt, y is an integer of 6 to 12 with x equal to 1, z is an integer of 30 to 80, and n is an integer of 3 to 100.

6. The electrochemical cell of claim 4, wherein the inorganic component is an isopolyacid or an isopolyacid salt.

7. A capacitor, comprising:

first and second electrodes;

an electrolyte positioned between the first and second electrodes, the electrolyte including an inorganic component comprising one of a polyacid or a polysalt, the electrolyte further including an organic component comprising a first polymer;

a current collecting material;

and an electroactive material;

wherein at least one of the first and second electrodes comprises a second polymer, which second polymer may be of the same material as the first polymer;

wherein at least one of the current collecting material and the electroactive material is embedded in the second polymer.

* * * * *